United States Patent
Aeron et al.

(10) Patent No.: US 11,841,758 B1
(45) Date of Patent: Dec. 12, 2023

(54) SYSTEMS AND METHODS FOR REPAIRING A COMPONENT OF A DEVICE

(71) Applicant: GE Precision Healthcare LLC, Wauwatosa, WI (US)

(72) Inventors: Harsha Aeron, Bangalore (IN); Steven James Huff, Waukesha, WI (US); Uwe Wiedmann, Clifton Park, NY (US); Bulent Alpay, Pewaukee, WI (US); Karim Choukri, Paris (FR)

(73) Assignee: GE Precision Healthcare LLC, Wauwatosa, WI (US)

( * ) Notice: Subject to any disclaimer, the term of this patent is extended or adjusted under 35 U.S.C. 154(b) by 0 days.

(21) Appl. No.: 17/867,382

(22) Filed: Jul. 18, 2022

Related U.S. Application Data

(60) Provisional application No. 63/309,857, filed on Feb. 14, 2022.

(51) Int. Cl.
*G06F 11/07* (2006.01)
*G06N 7/01* (2023.01)

(52) U.S. Cl.
CPC ...... *G06F 11/0736* (2013.01); *G06F 11/0757* (2013.01); *G06N 7/01* (2023.01)

(58) Field of Classification Search
CPC .................................................. G06F 11/0736
See application file for complete search history.

(56) References Cited

U.S. PATENT DOCUMENTS

| | | | |
|---|---|---|---|
| 6,175,934 B1* | 1/2001 | Hershey | H04B 7/18576 714/25 |
| 8,418,001 B2 | 4/2013 | Knörl | |
| 9,324,037 B2 | 4/2016 | Lösl | |
| 10,484,506 B2 | 11/2019 | Faizanullah | |
| 2008/0235172 A1* | 9/2008 | Rosenstein | G06N 7/01 706/46 |
| 2009/0276469 A1 | 11/2009 | Agrawal | |
| 2011/0083123 A1 | 4/2011 | Jian-Guang | |
| 2012/0191383 A1 | 7/2012 | Huff | |

(Continued)

FOREIGN PATENT DOCUMENTS

| | | |
|---|---|---|
| CN | 110034948 B | 9/2021 |
| EP | 1065619 A2 | 1/2001 |

(Continued)

OTHER PUBLICATIONS

Zapata Rivera, L. F. and Larrondo Petrie, M.; The Remote Laboratory Management System (RLMS) Pattern. jn 2, 3, Article 1 (May 2010), 9 pages. (Year: 2010).*

*Primary Examiner* — Joseph D Torres

(57) ABSTRACT

A system comprising a processor configured to obtain a feature set for a component and generate random trees based on the feature set and a training data set, wherein each of the random trees can include at least one predictive value representing a probability of a feature of the random trees indicating a failure of the component within a period of time. The processor can also select a subset of the random trees based on the at least one predictive value, determine a likelihood of the failure of the component based on operational data for one or more devices and the subset of the random trees, and transmit an explanation to a remote device for the likelihood of failure of the component by indicating the feature selected from the subset of the random trees.

20 Claims, 11 Drawing Sheets

(56) References Cited

U.S. PATENT DOCUMENTS

| | | | |
|---|---|---|---|
| 2013/0325374 A1 | 12/2013 | Häuser | |
| 2018/0268312 A1 | 9/2018 | Zhang | |
| 2018/0321667 A1 | 11/2018 | Cella | |
| 2019/0079820 A1 | 3/2019 | Anchuri | |
| 2021/0190850 A1* | 6/2021 | Gundel | G01R 31/1272 |
| 2023/0010781 A1* | 1/2023 | Ningappa | G06F 11/3664 |
| 2023/0087336 A1* | 3/2023 | Hadlock | G06F 11/008 |
| | | | 714/47.3 |

FOREIGN PATENT DOCUMENTS

| | | |
|---|---|---|
| WO | 2017126852 A1 | 7/2017 |
| WO | 2018162371 A1 | 9/2018 |
| WO | 2019060327 A1 | 3/2019 |

\* cited by examiner

SYSTEMS AND METHODS FOR REPAIRING A COMPONENT OF A DEVICE

CROSS-REFERENCE TO RELATED APPLICATIONS

The present matter is a non-provisional patent application claiming the benefit of U.S. Provisional Patent Application No. 63/309,857, filed Feb. 14, 2022, the contents of which are incorporated herein by reference.

FIELD

Embodiments of the subject matter disclosed herein generally relate to repairing a component of a device, and more specifically to identifying a component to be repaired.

BACKGROUND

Various electronic devices can experience degradation due to malfunctioning components over time. In some examples, detecting a component that is malfunctioning or a component that is to be replaced can enable the electronic devices to continue functioning as expected. For example, identifying components that are likely to fail within a short period of time can enable preemptive repairs of the components to ensure that a device remains operational.

BRIEF DESCRIPTION

This summary introduces concepts that are described in more detail in the detailed description. It should not be used to identify essential features of the claimed subject matter, nor to limit the scope of the claimed subject matter.

In some aspects, a system for detecting malfunctioning components can include a processor that can obtain a feature set for a component and generate random trees based on the feature set and a training data set, wherein each of the random trees can include at least one predictive value representing a probability of a feature of the random trees indicating a failure of the component within a period of time. The processor can also select a subset of the random trees based on the at least one predictive value, determine a likelihood of the failure of the component based on operational data for one or more devices and the subset of the random trees, and transmit an explanation to a remote device for the likelihood of failure of the component by indicating the feature selected from the subset of the random trees.

In some aspects, a method for maintaining a device can include obtaining a feature set for a component and generating one or more random trees based on the feature set and a training data set, wherein each of the one or more random trees comprises at least one predictive value representing a probability of a feature of the one or more random trees indicating a failure of the component within a period of time. The method can also include selecting a subset of the one or more random trees based on the at least one predictive value and determining a likelihood of the failure of the component based on operational data for one or more devices and the subset of the one or more random trees. The method can also include transmitting an explanation to a remote device for the likelihood of failure of the component by indicating the feature selected from the subset of the one or more random trees.

In other aspects, a non-transitory machine-readable medium for repairing a device can include a plurality of instructions that, in response to execution by a processor, cause the processor to obtain a feature set for a component and generate random trees based on the feature set and a training data set, wherein each of the random trees can include at least one predictive value representing a probability of a feature of the random trees indicating a failure of the component within a period of time. The plurality of instructions can also cause the processor to select a subset of the random trees based on the at least one predictive value, determine a likelihood of the failure of the component based on operational data for one or more devices and the subset of the random trees, and transmit an explanation to a remote device for the likelihood of failure of the component by indicating the feature selected from the subset of the random trees.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present examples will be better understood from reading the following description of non-limiting embodiments, with reference to the attached drawings, wherein below.

DETAILED DESCRIPTION

Embodiments of the present disclosure will now be described, by way of example, with reference to FIGS. 1-11, which relate to various embodiments of a system that facilitates identifying a component to be repaired or replaced. In some examples, identifying a component of a device that is to be repaired within a predetermined period of time can include generating any number of random trees based on one or more features. As discussed in greater detail below, the features can include any number of mathematical operations applied to data sets for one or more devices. The mathematical operations can identify a likelihood that a component of a device will fail within a predetermined period of time. In some examples, techniques herein can include identifying random trees that include features that predict failure of components. The techniques can also include combining any number of random trees so that any number of features that are predictive of a component failing can be combined and used to determine a probability of a defective component within a predetermined period of time. In some examples, the techniques can provide an explanation indicating how the probability was determined based on any number of threshold values, selected features, selected random trees, and the like. The explanation can enable a system to determine a likelihood that a component will fail within a predetermined period of time and explain how the system determined the likelihood.

The technical effect of identifying a component to be repaired or replaced can include generating one or more classification and regression trees and combining the classification and regression trees to form a modified classification and regression tree or a random forest that can provide an explanation for the features and threshold values used to determine if a component is to be repaired or replaced within a period of time. The present techniques have a technical advantage of enabling an artificial intelligence application or a machine learning technique to identify the component or components to be replaced or repaired and provide an explanation indicating how the artificial intelligence application determined the likelihood of a component failing within a period of time. The techniques herein differ from artificial intelligence applications, such as neural networks, that generate output without the ability to indicate or explain the criteria used by the artificial intelligence application to determine the output. The present techniques can prevent an electronic device from malfunctioning by proactively installing a replacement component or repairing an existing component. The present techniques can also ensure that an electronic device is capable of processing data and storing data without any failed or malfunctioning components, thereby reducing any downtime for the electronic device.

Figure 1:
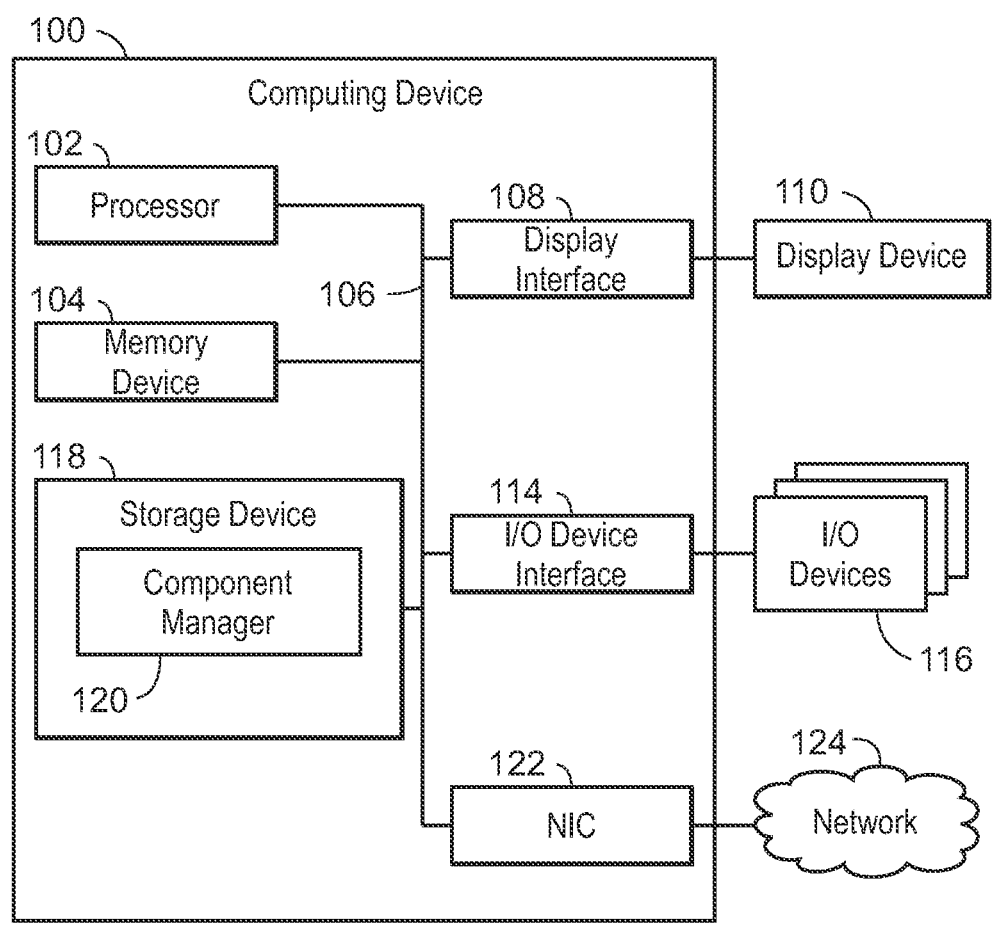
FIG. 1 schematically shows a system for repairing electronic devices, according to examples herein.

FIG. 1 is a block diagram of an example of a computing device that can detect a component to be repaired or replaced in an electronic device. The computing device 100 may be, for example, a hospital monitor, an anesthesia device, an imaging device, such as an x-ray device or a magnetic resonance imaging device, a laptop computer, a desktop computer, a tablet computer, a mobile phone, or one or more servers providing a remote service, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can detect a malfunctioning component of an electronic device, as described in greater detail below in relation to FIGS. 2 and 3.

The processor 102 may also be linked through the system interconnect 106 (e.g., PCI, PCI-Express, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, Organic light emitting diode OLED displays, among others.

The processor 102 may be connected through a system interconnect 106 to an input/output (I/O) device interface 114 adapted to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100 or may be devices that are externally connected to the computing device 100.

In some embodiments, the processor 102 may also be linked through the system interconnect 106 to a storage device 118 that can include a hard drive, an optical drive, a USB flash drive, an array of drives, or any combinations thereof. In some embodiments, the storage device 118 can include any suitable applications. In some embodiments, the storage device 118 can include a component manager 120. In some embodiments, the component manager 120 can obtain a feature set for a component, generate one or more random trees based on the feature set and a training data set, wherein each of the one or more random trees comprises at least one predictive value representing a probability of a feature of the one or more random trees indicating a failure of the component within a period of time, and select a subset of the one or more random trees based on the at least one predictive value. In some examples, the component manager 120 can also determine a likelihood of the failure of the component based on operational data for one or more devices and the subset of the one or more random trees, and transmit an explanation to a remote device for the likelihood of failure of the component by indicating the feature selected from the subset of the one or more random trees.

In some examples, a network interface controller (also referred to herein as a NIC) 122 may be adapted to connect the computing device 100 through the system interconnect 106 to a network 124. The network 124 may be a cellular network, a radio network, a wide area network (WAN), a local area network (LAN), or the Internet, among others. The network 124 can enable data, such as alerts, among other data, to be transmitted from the computing device 100 to remote computing devices, remote display devices, and the like. For example, the network 124 may enable remote devices (not depicted) to perform remote services and diagnostics.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the component manager 120 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the component manager 120 can be implemented with logic, wherein the logic, as referred to herein, can include any suitable hardware (e.g., a processor, among others), software (e.g., an application, among others), firmware, or any suitable combination of hardware, software, and firmware.

Figure 2:
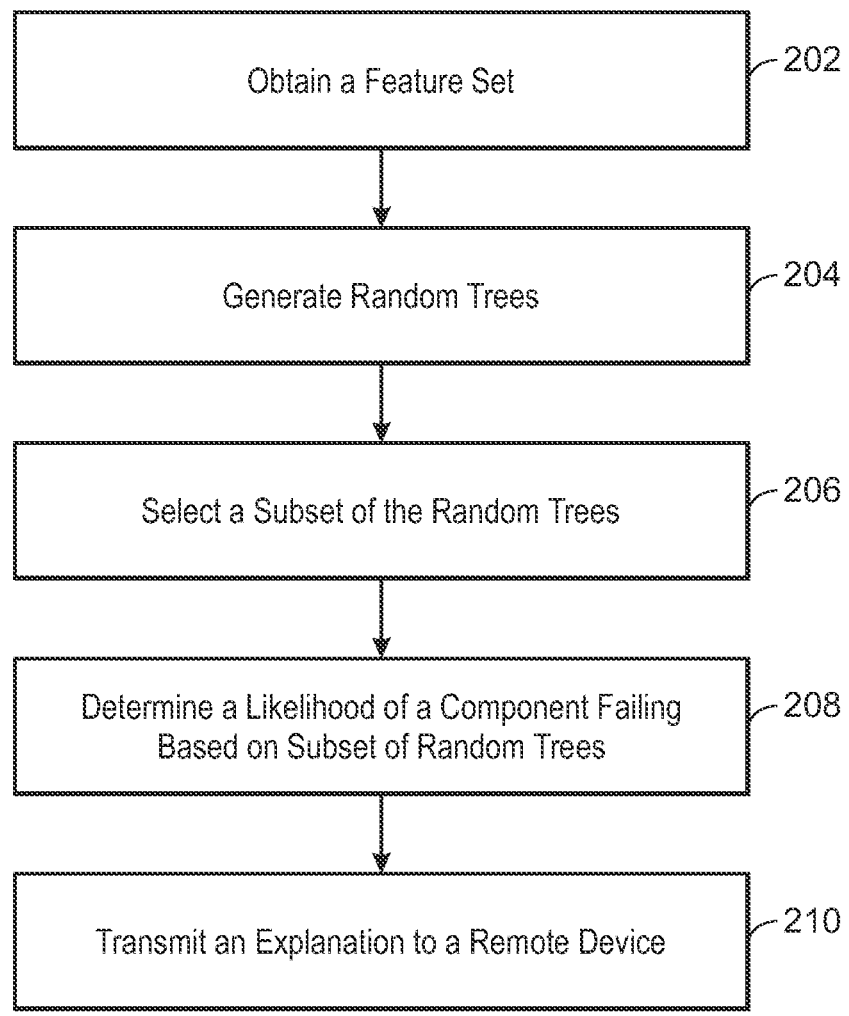
FIG. 2 shows an example process flow diagram of a method for repairing electronic devices, according to examples herein.

FIG. 2 illustrates a process flow diagram of an example method for repairing a component of an electronic device. In some examples, the method 200 can be implemented with any suitable computing system, such as the computing device 100 of FIG. 1, among others.

At block 202, the method 200 can include obtaining a feature set for a component. In some examples, the feature set can be determined using any suitable source data set such as error codes, parametric data, parts inventory data, knowledge base data, or any combination thereof. The source data set can be a training data set representing time series data for one or more components of a device such as an x-ray device, a magnetic resonance imaging device, or any suitable computing device. In some examples, the source data set is a time series for any suitable component for a device or for the device itself. For example, the source data set can include data representing operating characteristics for a battery of a device, a coil of a device, and the like. In some examples, the method 200 can include obtaining domain knowledge to determine the features to monitor or track in a feature set.

The feature set can include any suitable mathematical operations, logical operations, categorical data, or the like, based on the source data set. For example, the feature set can include average, mean, or max values calculated for any number of time periods within the source data set. The feature set can also include standard deviation calculations, mean squared deviations, a standard deviation count for a time period, exponential and logarithmic functions, Fourier transforms, and the like. In some examples, the feature set can be a feature vector or any other suitable data set. The feature set can also include categorical data such as a component type, a component revision, presence of a component in a system, or the like.

At block 204, the method 200 can include generating one or more classification and regression trees based on the feature set and a training data set. The classification and regression trees can include parent nodes identifying each feature in a classification and regression tree, threshold nodes indicating threshold values associated with leaf nodes, and the leaf nodes that can include a predictive value representing a probability of a component failing within a period of time. Any number of classification and regression trees, also referred to herein as random trees, can be generated based on one or more features randomly selected from the feature set along with randomly selected threshold values for each feature.

As discussed in greater detail below in relation to FIGS. 8-11, in some examples, multiple classification and regression trees can be generated and combined representing one or more features and a set of probabilities of detecting an error or fault in a component. In some examples, the combination of multiple classification and regression trees is a random forest. The random forest can be created using a random forest tree algorithm, a modified random forest tree algorithm, or any other suitable machine learning technique.

In some examples, the random trees can include a set of branches and leaves selected for a particular problem or error with a component. Each branch of the random forest can include a threshold that is either (i) a less than and greater than or equal to decision, or (ii) a less than or equal to and greater than decision. In some examples, a combination of multiple features can make a random tree and each branch of the random tree can represent a different feature and a different threshold value. In some examples, the leaf nodes include probability values indicating a likelihood of a set of features resulting in a component failing.

In some examples, any suitable machine learning technique can identify the components to be repaired using neural networks, random forests, modified random forest trees, deep learning techniques, or the like. For example, the machine learning technique can be initiated based on a set of components or parts previously installed in systems. In some examples, a system can generate a set of machine learning instructions that detect one or more components that resolve an issue of the device and execute the set of machine learning instructions to identify a set of components that are to be repaired to resolve an issue with the device.

At block 206, the method 200 can include selecting a subset of the one or more random trees based on at least one predictive value such as a probability value stored in a leaf node of a classification and regression tree or random tree. In some examples, the probabilities are based on a training data set. For example, the probabilities can indicate a likelihood that one or more features and threshold values in a classification and regression tree predict a component that will fail.

In some examples, probability values below a predetermined value can be grouped together and filtered or removed from the random forest. In some examples, the threshold values for features in the random forest can also be modified or adjusted.

At block 208, the method 200 can include determining a likelihood of the failure of the component based on operational data for one or more devices and the subset of the one or more random trees. For example, the method 200 can include applying any suitable operational data, such as log files, and the like, from one or more devices to any number of generated random trees. In some examples, each random tree can include one or more features that correspond to the device from which operational data is obtained. For example, a number of random trees can be generated for features representing a likelihood of failure of a component in a medical imaging device and log files from the medical imaging device can be applied to the random trees to determine if a component is likely to fail within a period of time.

At block 210, the method 200 can include transmitting an explanation to a remote device for the likelihood of failure of the component by indicating the feature selected from the subset of the one or more random trees. In some examples, the method 200 can include generating a trigger or alert to be transmitted to a remote device or a set of users. The alert can include an explanation that can include any suitable features along with one or more threshold values used to detect a component that is likely to fail. In some examples, the method 200 can include automatically generating a service request for a device based on one or more features that have a predictive value about a threshold. In some examples, the service request can indicate one or more components of a device to be repaired or replaced based on the detected predictive values or probabilities along with threshold values for one or more features. The service request can also indicate an actual value of the feature, in some examples.

In some examples, the method can include generating explainability data with high precision by providing output that indicates the features and thresholds used to determine a high probability of a failing component. The explainability data can include extracted patterns from a random forest that indicate one or more features used to determine a probability of a component failing. A pattern, as referred to herein, can include any number of parent nodes indicating selected features, threshold nodes indicating selected threshold values, and selected leaf nodes indicating high probability likelihoods of the selected threshold nodes and parent nodes identifying a failed component. In some examples, the method can include generating a lookup table that can be used to provide an output indicating the branches from the random forest and corresponding features used from a feature set.

The process flow diagram of method 200 of FIG. 2 is not intended to indicate that all of the operations of blocks 202-210 of the method 200 are to be included in every example. Additionally, the process flow diagram of method 200 of FIG. 2 describes a possible order of executing operations. However, it is to be understood that the operations of the method 200 can be implemented in various orders or sequences. In addition, in some examples, the method 200 can also include fewer or additional operations.

Figure 3:
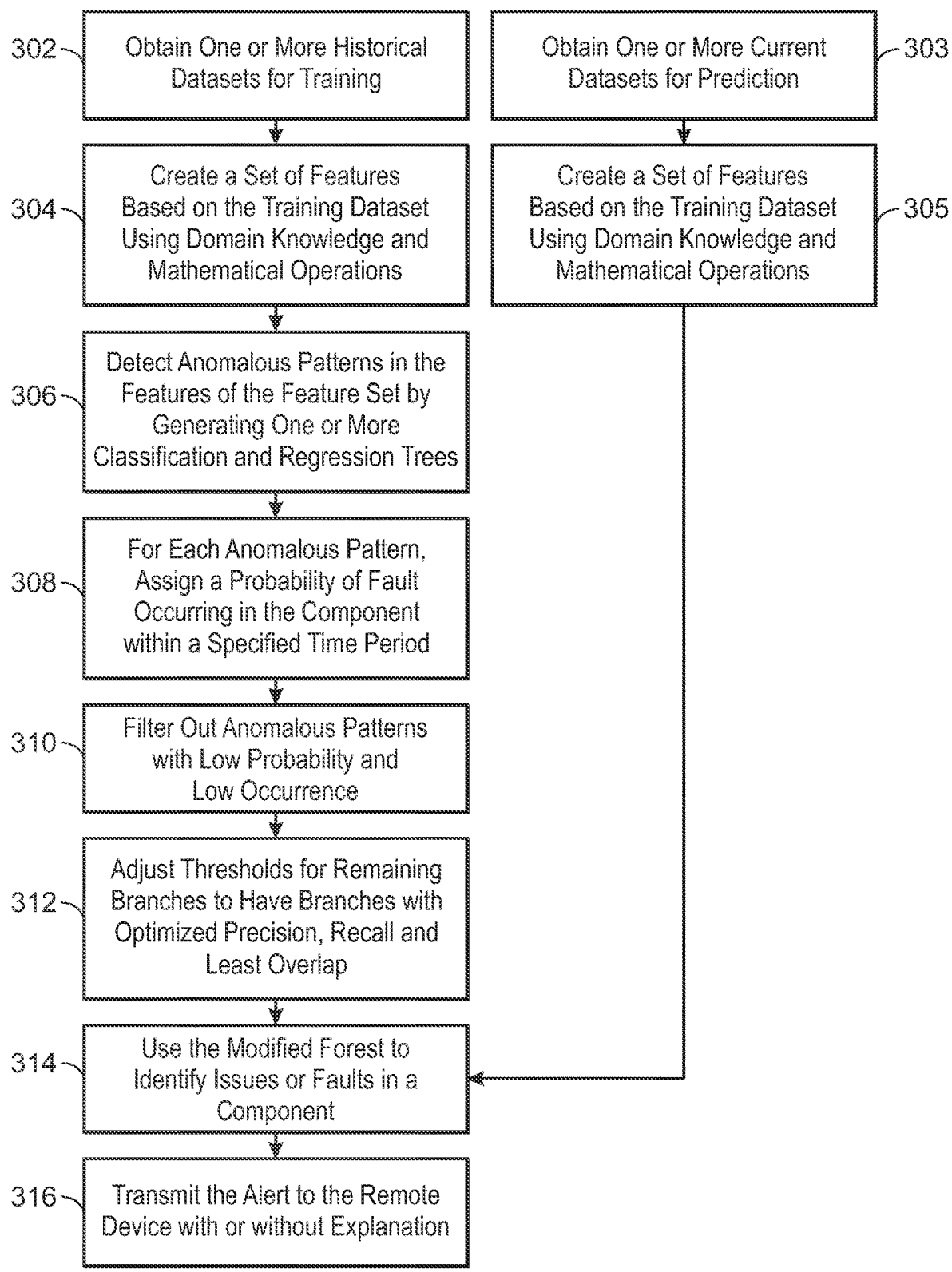
FIG. 3 illustrates a process flow diagram of an example method for identifying a component to be repaired in an electronic device, according to examples herein.

FIG. 3 illustrates a process flow diagram of an example method for identifying a component to be repaired in an electronic device. In some examples, the method 300 can be implemented with any suitable computing system, such as the computing device 100 of FIG. 1, an edge device that monitors any set of imaging devices or other devices to be serviced or repaired, or a remote service, among others.

At block 302, a method 300 can include receiving, detecting, or otherwise obtaining one or more historical training data sets. In some examples, each training data set represents time series data for one or more components of a device. For example, the time series data can include data for a battery of a device, a coil of a device, a display panel for a device, an input/output component for a device, a cooling system, a table coupled to an imaging device, or the like. The training data sets can include operational data or parametric data from one or more devices. In some examples, the method 300 can include obtaining one or more historical data sets which are used for training the model/explainable random forest.

At block 304, the method 300 can include creating a feature set based on the training data set using domain knowledge, mathematical operations, or a combination thereof. For example, the method can include detecting input that includes one or more mathematical operations or logical operations to apply to the training data set. In some examples, the method can include automatically selecting any number of features to be included in the feature set based on historical data.

In some examples, multiple features are created using domain-based features and data science-based features. The domain-based features can be created to capture domain knowledge. For example, for a signal to noise ratio fault in RF coils or gradient coils of magnetic resonance imaging (MRI) devices, domain knowledge can indicate that once a fault appears in the coils, the noise in different channels of the coils show separation when plotted against time. A standard deviation of noise of different channels can be created as a feature to capture a fault or error. In some examples, domain knowledge can indicate that before a signal to noise ratio fault sets in, the separation between channel noise can show oscillation i.e., the noise among channels separates then becomes normal then separates again over a period of time. To capture this phenomenon, the method can include creating features that include a count of standard deviations above a predetermined threshold over a period of time.

In some examples, the data science-based features can be created to capture peculiarities of a time series. Examples of such features are max, mean, median, area under curve, cross entropy, max to median ratio, median to min ratio, etc.

In some examples, the domain-based features can be created from the source data in a first step (e.g., standard deviation of noise of different channels), while a second step can create data-science-based features, using the output of step 1 as its input. The resulting combined features can then, for example, be the maximum of the standard deviation of noise of different channels, the standard deviation of the standard deviation of noise of different channels, etc.

In some examples, the method can include detecting, receiving, or otherwise obtaining signal to noise ratio for data streams provided by a medical device. The method can also include processing the signal to noise ratio for the data streams to determine standard deviations, minimum values, maximum values, a number of standard deviations that are exceeded within a period of time, or the like. The standard deviation for each signal to noise ratio can be below a predetermined threshold in some examples. If a data stream or a channel of data from a medical device exceeds the standard deviation, the method can indicate that the data stream has a failure or an anomaly.

In some examples, the method can include applying analysis to any number of data streams or channels from one or more components of a medical device such as data streams representing medical imaging data, among others. The signal to noise ratio for each data stream can be classified as high noise or low noise based on a comparison to standard deviations or any other logical operators applied to historical datasets. In some examples, the standard deviation values for a data stream can be aggregated over a period of time and compared to a model to determine if a signal to noise ratio exceeds a predetermined value. In one example, the method can include calculating, receiving, or otherwise obtaining a standard deviation for a medical imaging examination and comparing the standard deviation to an overall standard deviation of noise data for a day, etc. Accordingly, the method can include continuously adjusting the standard deviation on a daily basis, or any other suitable time period, to enable identifying data streams that represent a component that has failed or is generating anomalous data indicating an expected failure of the component.

At block 306, the method 300 can include detecting any combination of features and threshold values, also referred to herein as anomalous patterns, from a feature set, wherein the combination of features and threshold values are likely to identify a failing component. In some examples, block 306 is executed by creating or generating multiple classification and regression trees and combining to generate a random forest based on selected features sets. In some examples, a classification and regression tree can be generated for each feature and multiple classification and regression trees can be randomly combined to form a random forest. In some examples, the method can include determining a probability of one or more features causing an issue with a component within a period of time based on the training data set. The probability of a set of features causing an issue with a component within a period of time can be stored as a leaf node in the classification and regression trees.

In some examples, the method 300 can include selecting probability values with a predetermined value above or equal to a threshold, such as 100%, among others. The method 300 can then include detecting the coverage for an issue within a predetermined period of time based on historical data. In some examples, the method 300 can include selecting leaf nodes with lower probability values, such as 90%, among others. The classification and regression trees representing the selected leaves can be added to a random forest to provide more coverage for detecting issues for a component within a period of time while maintaining high precision.

In some examples, the method can include generating any number of random trees based on combinations of selected features. For example, each random tree can be generated using a different combination of mathematical operators for analyzing a data stream and threshold values for each random tree can be different. The method can also include analyzing the random trees based on historical data, such as service request data for components, to determine the random trees with selected features and thresholds that have a predictive value above a threshold. The historical data can include data streams that provide a ground truth comparison. In some examples, random trees can be selected if the features and thresholds of the random trees identify a component that is likely to fail within a predetermined period of time. The branches of random trees with selected features, threshold values, or a combination thereof that are not predictive of a failed component can be deleted or otherwise removed. As a result, the selected random trees that are stored in a system or otherwise maintained can indicate a high likelihood of identifying a component that is to fail within a predetermined period of time. In some examples, the historical dataset can include timestamp information that enables the method to determine whether a component has failed within a period of time.

At block 308, the method 300 can include, for each anomalous pattern, calculating or assigning a probability or predictive value of a feature pattern resulting in an error within a period of time. In some examples, the calculation can be determined based on historical data applied to the random forest. For example, the method 300 can include identifying leaf nodes in the random forest with a probability value that is higher than a predetermined value and/or a predictive value that is higher than a predetermined value. The branches or parent nodes for the leaf nodes can be classified as anomalous patterns with a high probability of causing an issue in a component within a period of time. The description of FIG. 7 below provides additional information regarding calculating or assigning a probability of a feature pattern resulting in an error within a period of time.

In some examples, the method can learn a path through any number of random trees, also referred to herein as a random forest, to determine a class of events that indicate failure of a component. For example, each random tree has branches that correspond to one or more features obtained or calculated from a data stream. In some examples, a random tree can include any number of leaf nodes that indicate a number of features that predict failure of a component. For example, a leaf node can store a 90% value indicating that the leaf node has a 90% probability of predicting failure of a component based on a training data set in which 10 training cases fulfilled the criteria to reach the leaf node and 9 of the training cases corresponded to a failing component while one training case did not correspond to a failing component. In some examples, the training data set indicates a time period for failure of a component and provides a temporal aspect for determining when a component will fail.

At block 310, the method 300 can include filtering out low probability anomalous patterns by removing branches that are parent nodes for leaves in the random forest with probabilities below a predetermined value.

In some examples, each anomalous pattern is associated with a probability. The filtering can include selecting the anomalous patterns with probability numbers that are above a certain threshold and reject all others.

In some examples, filtering can also include selecting the anomalous patterns with high occurrence. For example, when multiple trees are created or generated, some of the anomalous patterns are repeated across trees while many patterns are not repeated as often. For example, it is possible that if 100 trees are generated, a 1-3-7 pattern may occur in 90% of the trees while a 1-3-6-12 pattern may occur in 20% of the trees. The method can include selecting the anomalous patterns which have occurred above a certain threshold.

In some examples, selection of anomalous patterns can be based on occurrence after removing anomalous patterns with a low probability. Additionally, in case of numeric features, the method can detect a margin for matching two patterns. For example, a 1-3-7 pattern in one tree might have experienced <=5, while in another tree the same 1-3-7 pattern may have experienced <=4. If the method uses a buffer of +/−1, then both the splits at experience will be counted the same.

At block 312, the method 300 can include adjusting thresholds for remaining branch nodes to form a modified random forest. For example, the threshold values for one or more parent nodes or branches can be modified so that the threshold values indicating a selection of a leaf node are adjusted to increase the precision of the random forest. In some examples, the method can include adjusting split or threshold values for numerical features to determine the impact on precision, recall and overlap between patterns. For example, in the pattern 1-3-7, the method can include adjusting the values of experience from 5 to 4 and 5 to 6 to see if precision, recall and overlaps are improving. The precision, recall and overlaps can be tested using the ground truth provided in training dataset.

In some examples, the method can include shifting thresholds for features in a random tree by increasing or decreasing the thresholds. The method can recalculate the accuracy of the feature based on historical datasets. The method can also determine or calculate a precision, recall, and overlap based on historical datasets and the selected random trees.

For example, the method can include calculating, determining or otherwise obtaining a precision value for each feature or a set of features identified within any number of random trees. The precision value can be calculated by dividing a true positive value for a feature to identify a failed component by the true positive value plus the false positive value. In some examples, the true positive and false positive values are determined based on historical data sets and any number of features incorporated into selected random trees.

In some examples, the method can also calculate, determine, or otherwise obtain a recall value that represents a number of failures identified by a feature or a set of features.

In some examples, the method can also calculate, determine, or otherwise obtain an overlap value that indicates a number of branches or features that overlap among the selected random trees. Identifying and removing overlapping branches or features is described in greater detail below in relation to FIGS. 8-10. At block 314, the method 300 can include detecting operational data and applying the operational data to a modified random forest. In some examples, the operational data for a device, such as an imaging device, among others, can be received at block 303 in real-time or near real-time and processed using the random forest tree to determine if an error is likely to occur within a component of the device. In some examples, at block 305, the method 300 can include creating a set of features based on the training dataset using domain knowledge and mathematical operations as described above in relation to block 304.

For example, the method can include detecting, receiving, or otherwise obtaining operational data, such as real-time data representing the operating characteristics of one or more components for a device. In some examples, the operating characteristics can include a battery characteristic, a coil characteristic, an input/output device characteristic, or a combination thereof. The method can include using the modified random forest to determine if the real-time data indicates an anomalous pattern for one or more components of a device.

At block 316, the method 300 can include transmitting an alert to a remote device with or without an explanation for the selected features used to generate the alert. In some examples, the alert can indicate that an anomalous pattern has been detected, received, or otherwise obtained. The alert can include the component that is to be repaired and the threshold values from the modified random forest used to determine that the component is to be repaired. In some examples, the alert can also include the features corresponding to the threshold values and the probability values in the leaf nodes representing a likelihood that a component will have an issue causing a need for repair.

In some examples, the alert can be displayed by a display panel coupled to a computing device, an edge device, or a display panel coupled to a remote device. The alert can also be transmitted to one or more user devices, email addresses, or the like, wherein the user devices are selected based on a type of issue or error to be repaired in a device. The alert represents predictive analysis to enable detecting a component is likely to fail within a period of time and ensure that the component is repaired or replaced before the component fails.

In regard to the example in FIG. 7 discussed below, a pattern itself becomes the explanation. For example, the pattern 1-3-7 becomes the explanation as the candidate has undergraduate qualification only, which is in humanities and has less than 5 years of experience after qualification. Hence there is an 80% probability that the candidate will start a company within a year.

In some examples, as illustrated in FIGS. 8-11 below, one or more random trees can be created and adjusted by removing duplicate branches or features, adjusting threshold values, or the like. The adjusted random trees can be used to select the features and thresholds transmitted to remote devices, display panels, and user devices, among others.

The process flow diagram of method 300 of FIG. 3 is not intended to indicate that all of the operations of blocks 302-316 of the method 300 are to be included in every example. Additionally, the process flow diagram of method 300 of FIG. 3 describes a possible order of executing operations. However, it is to be understood that the operations of the method 300 can be implemented in various orders or sequences. In addition, in some examples, the method 300 can also include fewer or additional operations.

Figure 4:
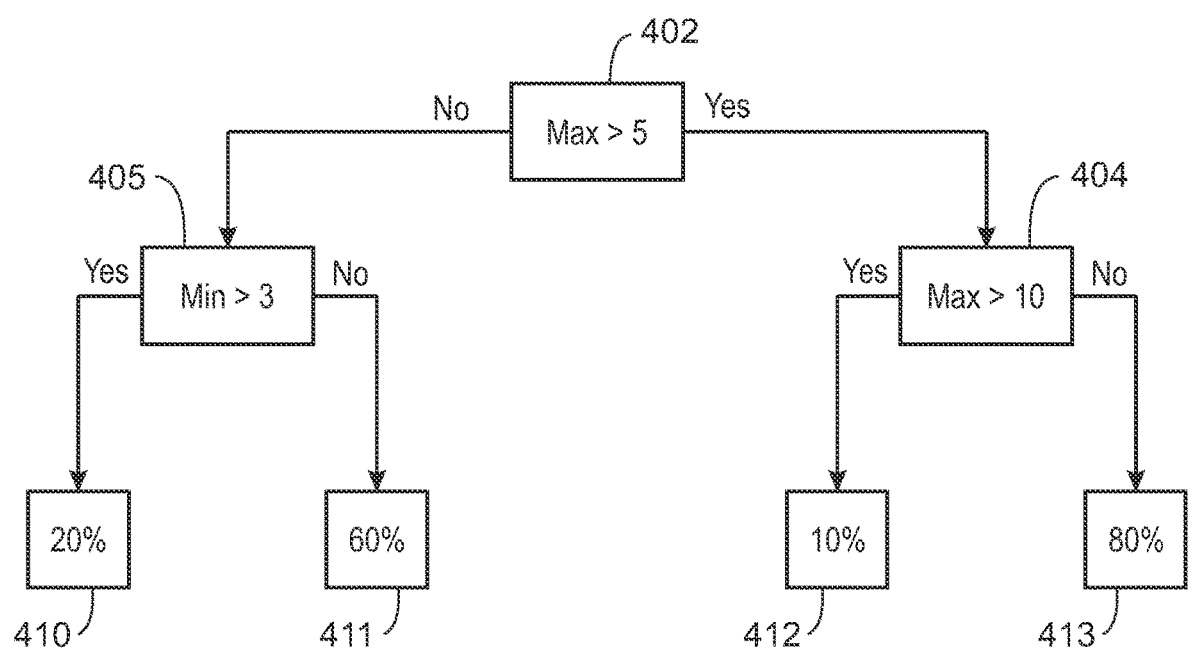
FIG. 4 is a block diagram illustrating an example classification and regression tree, according to examples herein.

FIG. 4 is a block diagram illustrating an example classification and regression tree. The classification and regression tree can be generated with any suitable computing device, such as the computing device 100 of FIG. 1, among others.

The classification and regression tree 400 can include any number of levels of parent nodes 402, 404, and 405 that represent features of the feature set. For example, each level of parent nodes 402, 404, and 405 can represent different mathematical operations or logical operations used to analyze real-time data for a component of a device. The mathematical operations can include a maximum value, a minimum value, or a standard deviation, among others. The parent node 402 can result in selecting a maximum feature or a minimum feature based on any suitable threshold values for each feature. For example, a maximum value greater than 5 can result in selecting parent node 404, while a maximum value that is not greater than 5 can result in selecting parent node 405. In some examples, the parent nodes 402, 404, and 405 can include threshold values that indicate a probability of each parent node 402, 404, and 405 identifying a component that will fail within a period of time. For example, the parent node 405 for the minimum feature can indicate that a minimum value that is less than 3 has a 20% likelihood or probability 410 of identifying a failing component. A minimum value that is greater than 3 may have a 60% likelihood or probability 411 of identifying a failing component. Similarly, the parent node 404 for a maximum feature may identify a failing component with a 10% probability 412 if the maximum is greater than 10 and with an 80% probability 413 if the maximum value is less than 10. In some examples, any number of leaf nodes with probabilities 410, 411, 412, and 413 can indicate a likelihood that the parent nodes 402, 404, and 405 represent features that indicate if a component will need to be replaced or repaired within a predetermined period of time.

It is to be understood that the block diagram of FIG. 4 is not intended to indicate that the classification and regression tree 400 is to include all of the parent nodes 402, 404, and 405 and leaf nodes 410, 411, 412, and 413 shown in FIG. 4. In some examples, the classification and regression trees can be binary trees or the classification and regression trees can have any suitable structure in which parent nodes have any number of child or leaf nodes. Example illustrations of classification and regression trees are described below in greater detail in relation to FIGS. 8-10.

Figure 5:
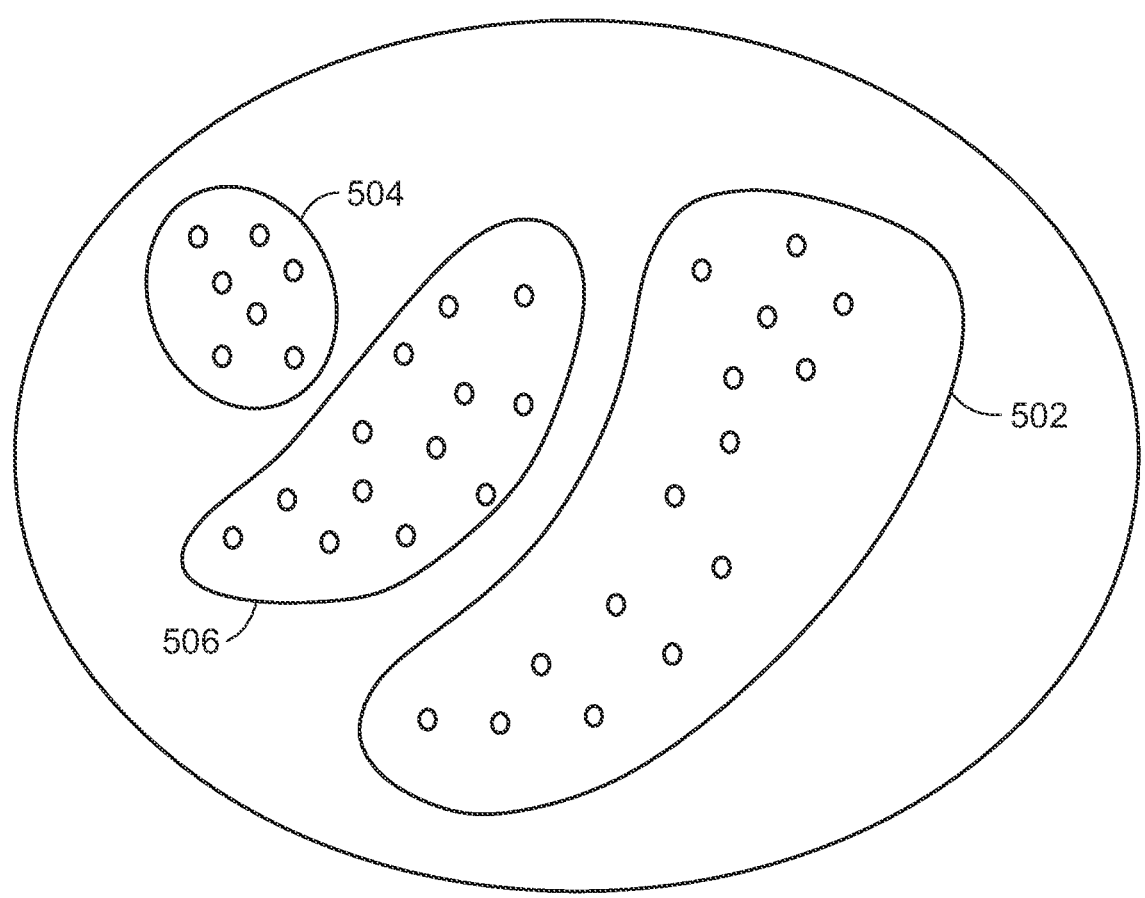
FIG. 5 illustrates an example feature set that is filtered using the classification and regression trees, according to examples herein.

FIG. 5 illustrates an example feature set that is filtered using the classification and regression tree. In some examples, the feature set 500 includes any number of features with probabilities that each feature can identify a failing component for a device. The features 502 that have a low probability of predicting a failing component can be removed from the classification and regression tree. For example, the features 502 and corresponding leaves and parent nodes can be removed from a classification and regression tree if the probability values in the leaves for features 502 are below a predetermined value. In some examples, a partition or subset 504 of the features 502 can be selected if the probability of the partition or subset 504 of the features 502 is above a threshold level. For example, a number of features that predict a likelihood of a component failing within a period of time can be selected as the partition or subset 504 of the features 502. The remaining unselected features 506 can correspond to features incorporated into random trees that are not selected to determine if a component has failed.

Figure 6:
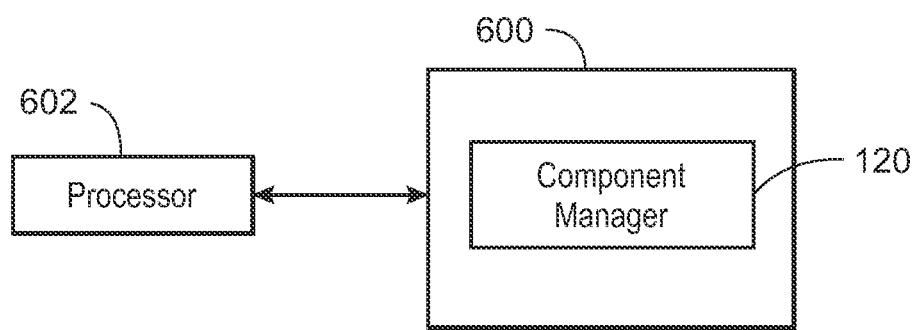
FIG. 6 is an example of a non-transitory machine-readable medium for identifying a component to be repaired or replaced, in accordance with examples herein.

FIG. 6 is an example of a non-transitory machine-readable medium for identifying a component to be repaired or replaced, in accordance with examples herein. The non-transitory, machine-readable medium 600 can cause a processor 602 to implement the functionalities of methods 200 and 300. For example, a processor of a computing device (such as processor 102 of FIG. 1), can access the non-transitory, machine-readable media 600.

In some examples, the non-transitory, machine-readable medium 600 can include instructions to execute a component manager 120. For example, the non-transitory, machine-readable medium 600 can include instructions for the component manager 120 that cause the processor 602 to obtain a feature set for a component and generate one or more random trees based on the feature set and a training data set, wherein each of the one or more random trees comprises at least one predictive value representing a probability of a feature of the one or more random trees indicating a failure of the component within a period of time. The instructions for the component manager 120 can also cause the processor 602 to select a subset of the one or more random trees based on the at least one predictive value and determine a likelihood of the failure of the component based on operational data for one or more devices and the subset of the one or more random trees. Furthermore, the instructions for the component manager 120 can cause the processor 602 to transmit an explanation to a remote device for the likelihood of failure of the component by indicating the feature selected from the subset of the one or more random trees. In some examples, the non-transitory, machine-readable medium 600 can include instructions to implement any combination of the techniques of the method 200 and 300 described above.

Figure 7:
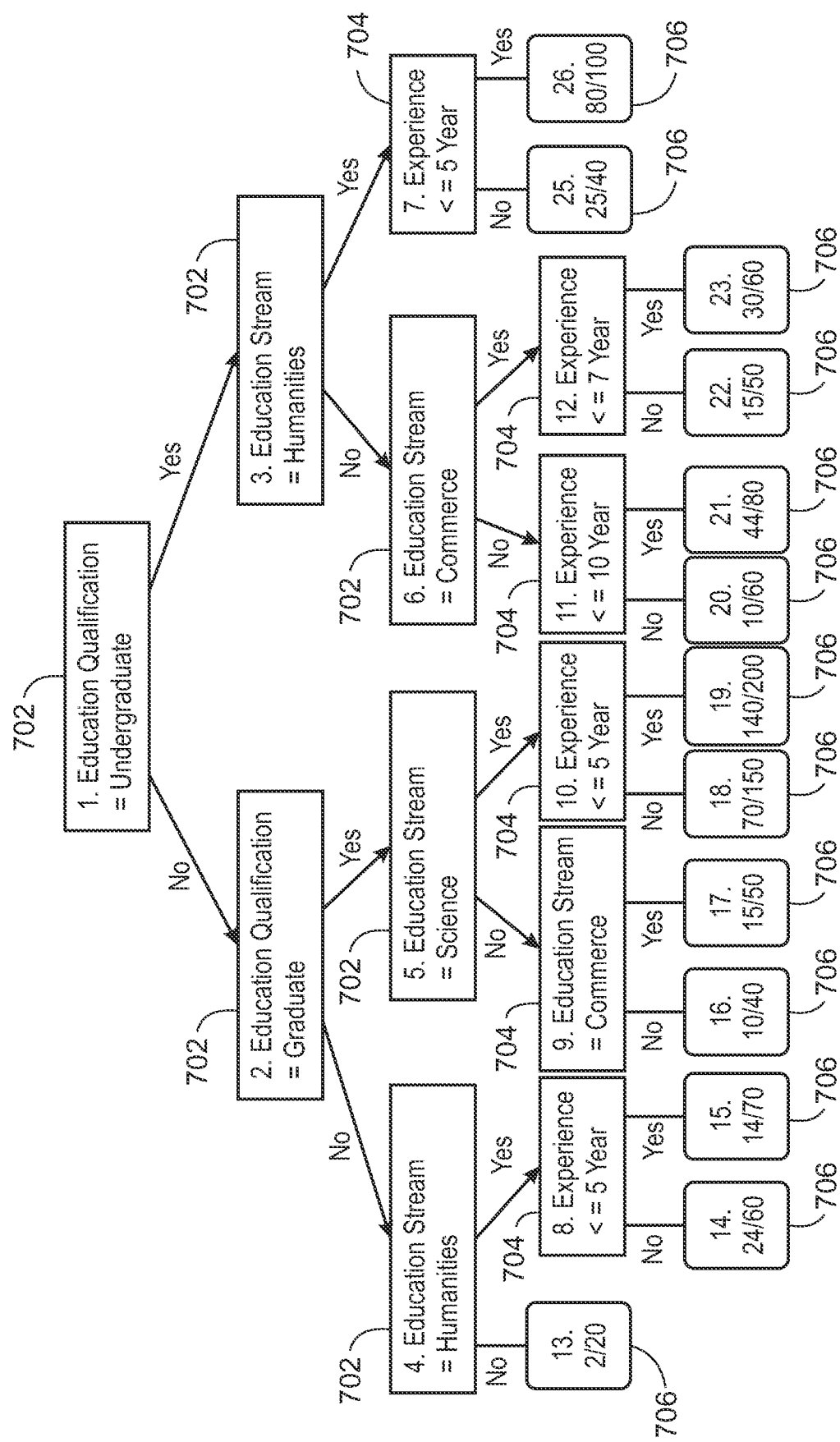
FIG. 7 illustrates an example classification and regression tree, according to examples herein.

FIG. 7 illustrates an example classification and regression tree. The example classification and regression tree 700 can be generated based on a dataset of 1000 people with three information pieces for each person: i.e., Education Qualification (Undergrad, Graduate or Doctorate), Stream of Undergraduate (Science, Humanities or Commerce) and Number of Years of Experience (more than equal to zero). In one example, the classification and regression tree 700 can be used to predict who will start his/her own start up next year.

In the classification and regression tree 700, the rectangle boxes depict a feature 702 and the split at the features 702. These are called nodes in artificial intelligence terminology. Each node is numbered. A combination of different features and the splits make a pattern, for example nodes or features 702 numbered 1-3-7 can create a pattern. The rounded boxes at the bottom of the classification and regression tree are called leaf nodes 706, which are also numbered. The leaf nodes 706 can indicate the result of a pattern based on threshold nodes 704. In one example, leaf node 26 can represent the number 80/100, which indicates the pattern 1-3-7 applies to 100 persons out of 1000 persons in the dataset and out of these 100 persons to which this pattern is applied, 80 have started the company within 1 year. Thus 80/100 (80%) indicates the probability of an event happening, in this case starting a company in 1 year. The value 100 represents the recall of the pattern: i.e., 100/1000 which is equal to 10%.

In some examples, the nodes can correspond to any number of mathematical operators applied to data from devices, such as medical devices. For example, the nodes can represent maximum values, minimum values, standard deviations, and the like, identified within time series data obtained from a component of a device. The data can represent signal to noise ratios for channels of a component, or the like.

Figure 8:
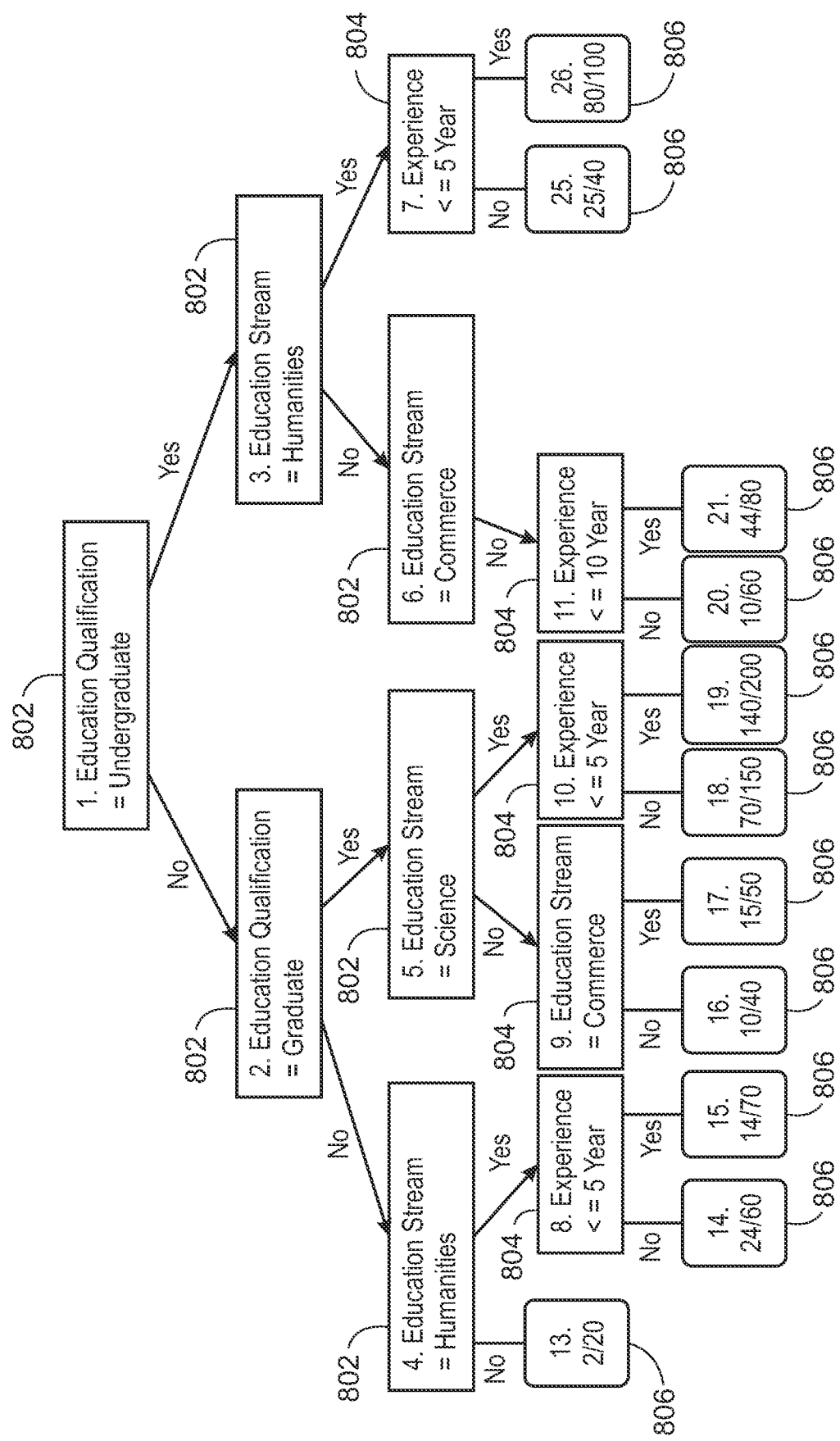
FIGS. 8, 9, and 10 depict example random trees being generated, analyzed, and processed, according to examples herein.
Figure 9:
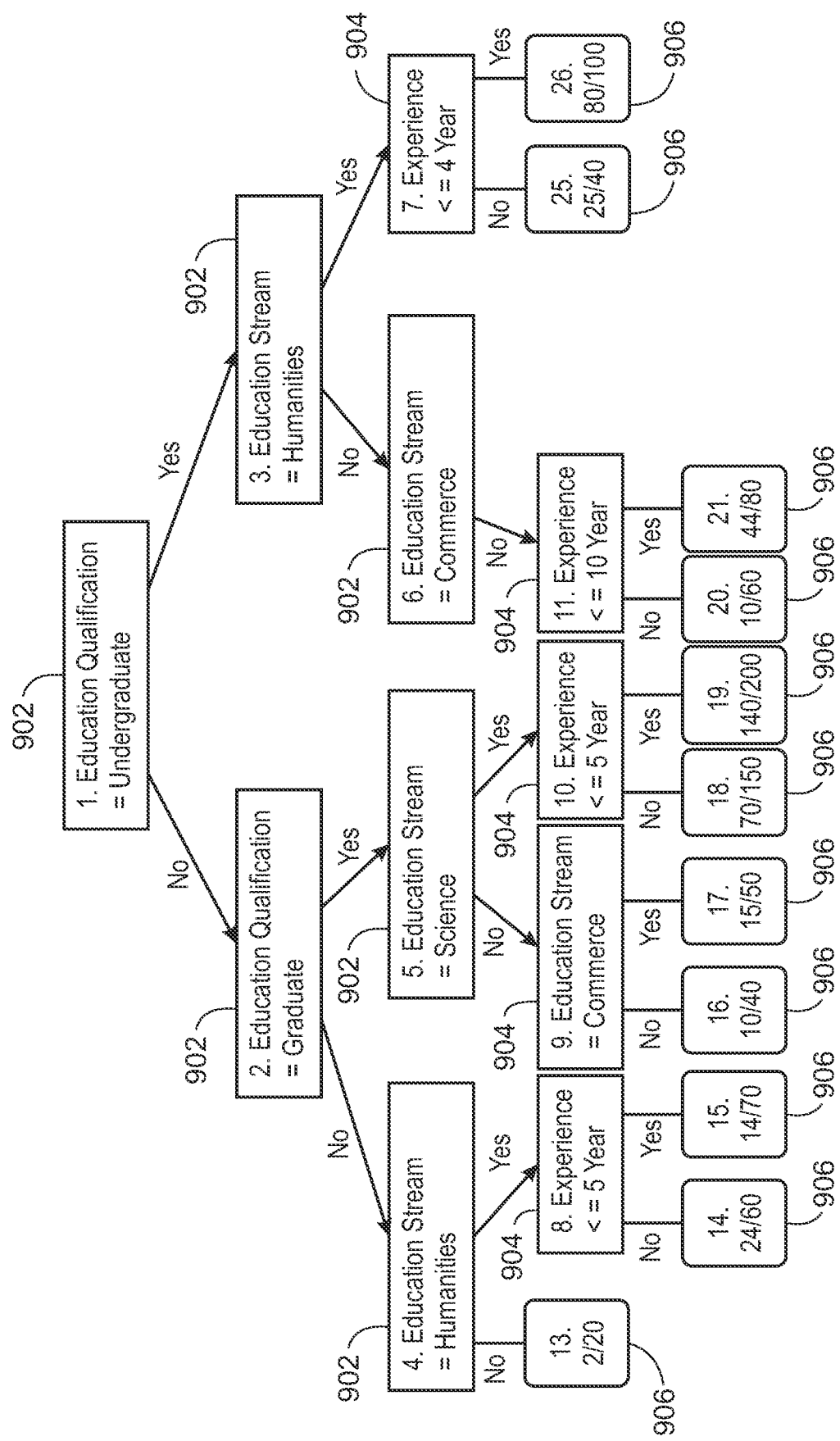
Figure 10:
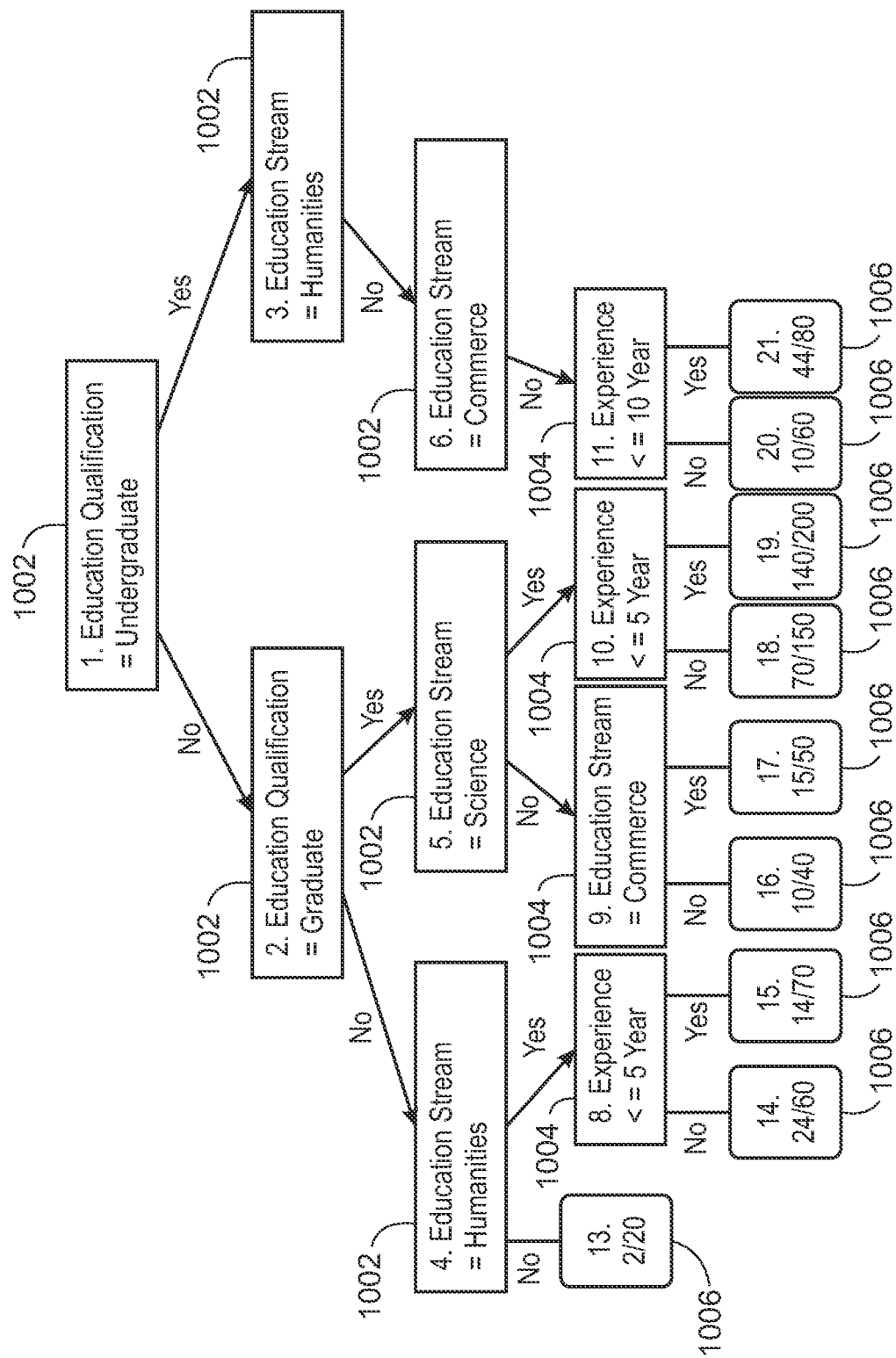

FIGS. 8, 9, and 10 depict multiple example random trees being generated, analyzed, and processed. In FIG. 8, the random tree 700 of FIG. 7 is depicted as random tree 800 with missing branches that correspond to low probability features. The random tree 800 can include any number of parent nodes 802, threshold nodes 804, and leaf nodes 806. For example, a threshold node 804, branch 12, representing years of experience and leaf nodes 806 also referred to as 22 and 23 can be removed because the probability of leaf node 22 is 15/50 and the probability of leaf 23 is 30/60. Accordingly, the predictive value for leaves 22 and 23 may be below a predetermined threshold of 51%. In some examples, any branches or thresholds which are parent nodes 804 to leaf nodes 806 with a probability lower than a predetermined value can be removed. For example, each of the branches or thresholds that are parent nodes 804 for leaf nodes 806 with a probability value of 50% or lower may be removed.

In some examples, the random tree 800 can include leaf nodes 806 corresponding to any number of features. For example, the random tree 800 can include leaf nodes 806 representing the probabilities that two features represent a likelihood that a component is to fail within a period of time. The random tree 800 can be modified so that leaf nodes 806 with a probability below a first threshold for a first feature and a second threshold for a second feature can be removed from the random tree 800. For example, a first leaf node with a probability of 40% can be removed for a first feature and a second leaf node with a probability of 55% can be removed for a second feature.

In FIG. 9, the thresholds for the random tree 900 can be adjusted. The random tree 900 can include any number of parent nodes 902, threshold nodes 904, and leaf nodes 906. For example, the experience level in feature or threshold node 904 block 7 can be modified from less than or equal to 5 years to less than or equal to 4 years or less than or equal to 6 years, among others. The probability value stored in leaves 906 blocks 25 and 26 can then be recalculated to determine if the adjusted threshold results in a higher probability value. In some examples, the thresholds can be increased or decreased any suitable amount to reevaluate the probability that the thresholds for a feature predict a failure of a component within a specified period of time.

In FIG. 10, the random tree 1000 can be compared to other selected random trees to identify duplicate branches. The random tree 1000 can include any number of parent nodes 1002, threshold nodes 1004, and leaf nodes 1006. For example, the branch or threshold node 904 block 7 of FIG. 9 may be included in multiple random trees such as 1000 among others. In some examples, the branch or threshold 904 block 7 of FIG. 9 can be removed from random tree 1000.

In some examples, each branch of random trees 800, 900, and 1000 can represent a different feature or mathematical operator such as one branch for a standard deviation being exceeded, another feature for a maximum value being exceeded, and another feature for a minimum value being exceeded, among others. As discussed above in relation to FIG. 9, the threshold values for each feature can be adjusted to determine the highest likelihood or probability for identifying a failure in a component to be stored in a leaf node. Any mathematical operators with leaf nodes below a predetermined threshold can be removed from the random tree due to a low likelihood for predicting a failed component.

In some examples, the random tree 1000 can be combined to form any suitable random tree that can identify features that represent a failure to a component. For example, a random tree with leaves and thresholds for a standard deviation can be combined with a random tree with leaves and thresholds for a maximum value and a random tree with leaves and threshold for a minimum value. In one example, the combination of the random trees corresponding to a standard deviation, a maximum value, and a minimum value, among other features, can identify a leaf node with a probability that a device will malfunction within a period of time.

Figure 11:
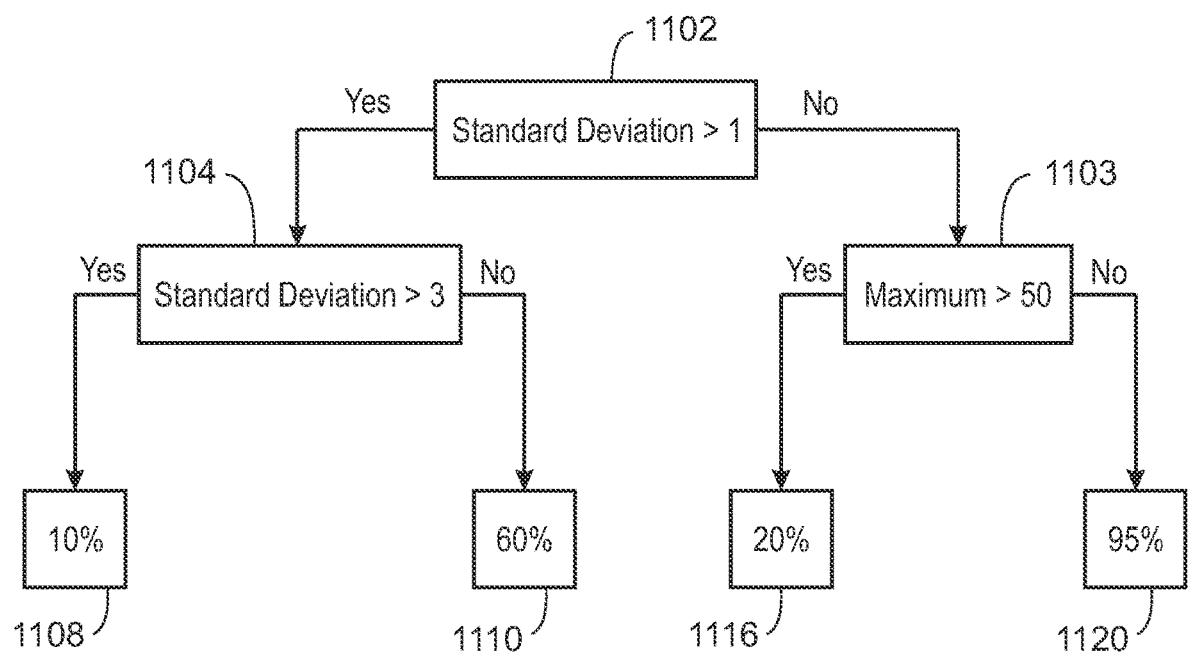
FIG. 11 depicts an example random tree used to process operational data, according to examples herein.

FIG. 11 depicts an example random tree used to process operational data. In some examples, the example random tree 1100 can be generated using any suitable technique implemented by the computing device 100 of FIG. 1, among others.

In some examples, operational data can be obtained for a period of time and a set of features can be generated for the operational data. The set of features can be compared to the features and thresholds of one or more selected random trees. In some examples, the set of features can include a standard deviation 1102, a maximum value 1103, or the like. For example, the standard deviation 1102 being greater than 1 can be one feature threshold 1104 in a selected random tree 1100. If the operational data has a standard deviation greater than or equal to 1, the random tree 1100 can indicate a probability 1108, such as 10%, among others, that a component will fail within the time period from which operational data was acquired. A feature threshold 1106 indicating a standard deviation less than 1 may indicate a probability 1110 of 60%, among other values, that a component will fail.

In some examples, two or more features can be calculated or obtained based on an operational data set and the two or more features can be compared to a selected random tree with the two or more features. For example, the random tree 1100 can include a parent node 1102 that represents a standard deviation 1102 that is greater than a threshold value, such as 1, among others. The parent node 1102 can use the threshold value to determine whether to consider a standard deviation 1104 feature or a maximum 1103 feature for data from a particular data stream within a period of time. The standard deviation 1104 feature can indicate that a standard deviation greater than or equal to 3 has a 10% probability 1108 of predicting a failing component while a standard deviation that is less than 3 has a 60% probability 1110 of predicting a failing component. In some examples, the feature threshold in the maximum 1103 feature can indicate that a maximum value less than or equal to 50 can have a probability 1116 of 20% of predicting a component will fail within a period of time. A maximum value greater than 50 can have a probability 1120 of 95% of predicting a component will fail within a period of time. In some examples, the probability value stored in a leaf of the selected random tree can indicate a likelihood that a component will fail within a period of time if the component generates data with the two or more features.

In some examples, the random trees 800, 900, and 1000 can be updated periodically, and the operational data can be processed by the updated random trees 800, 900, and 1000 to determine a likelihood that a component will fail. The features and thresholds in the random trees 800, 900, and 1000 can be transmitted to a remote device, provided by a display device, or otherwise provided to a user. In some examples, the features and threshold in the random trees 800, 900, and 1000 can be modified or adjusted based on user input. For example, a device can enable transmitting the features and thresholds of the selected random trees to a user. The device can also detect, receive, or otherwise obtain user input indicating that the features and/or thresholds of the selected random trees 800, 900, and 1000 are to be modified.

EXAMPLES

In one example, a system for detecting malfunctioning components can include a processor that can obtain a feature set for a component and generate random trees based on the feature set and a training data set, wherein each of the random trees can include at least one predictive value representing a probability of a feature of the random trees indicating a failure of the component within a period of time. The processor can also select a subset of the random trees based on the at least one predictive value, determine a likelihood of the failure of the component based on operational data for one or more devices and the subset of the random trees, and transmit an explanation to a remote device for the likelihood of failure of the component by indicating the feature selected from the subset of the random trees.

Alternatively, or in addition, the processor can determine that the at least one predictive value for the one or more features of the one or more random trees does not indicate the failure of the component, wherein there are at least two features in the one or more random trees. The processor can also filter the at least one feature that does not indicate the failure of the component.

Alternatively, or in addition, the feature set represents one or more mathematical operations performed on a source data set, the one or more mathematical operations comprising a standard deviation, a minimum value, a maximum value, or a combination thereof. Alternatively, or in addition, the source data set represents operational data from a medical device comprising an x-ray device or a magnetic resonance imaging device. Alternatively, or in addition, the operational data represents a battery characteristic, a coil characteristic, an input/output device characteristic, or a combination thereof. Alternatively, or in addition, the processor can optimize the selecting the subset of the one or more random trees by removing at least one branch from the one or more random trees to decrease overlap between features of the one or more random trees.

Alternatively, or in addition, the processor can transmit an alert comprising the explanation to the remote device, and wherein the alert comprises a message indicating the component of a device along with the probability of failure of the component within the period of time and the threshold for one or more features of the feature set used to determine the probability of failure of the component.

In some examples, a method for maintaining a device can include obtaining a feature set for a component and generating one or more random trees based on the feature set and a training data set, wherein each of the one or more random trees comprises at least one predictive value representing a probability of a feature of the one or more random trees indicating a failure of the component within a period of time. The method can also include selecting a subset of the one or more random trees based on the at least one predictive value and determining a likelihood of the failure of the component based on operational data for one or more devices and the subset of the one or more random trees. The method can also include transmitting an explanation to a remote device for the likelihood of failure of the component by indicating the feature selected from the subset of the one or more random trees.

Alternatively, or in addition, the method can include determining that the at least one predictive value for the one or more features of the one or more random trees does not indicate the failure of the component, wherein there are at least two features in the one or more random trees and filtering the at least one feature that does not indicate the failure of the component. Alternatively, or in addition, the feature set represents one or more mathematical operations performed on a source data set. Alternatively, or in addition, the source data set represents operational data from a medical device comprising an x-ray device or a magnetic resonance imaging device. Alternatively, or in addition, the operational data represents a battery characteristic, a coil characteristic, an input/output device characteristic, or a combination thereof. Alternatively, or in addition, the method can include optimizing the selecting the subset of the one or more random trees by removing at least one branch from the one or more random trees to decrease overlap between features of the one or more random trees. Alternatively, or in addition, the method can include transmitting an alert comprising the explanation to the remote device, and wherein the alert comprises a message indicating the component of a device along with the probability of failure of the component within the period of time and the threshold for one or more features of the feature set used to determine the probability of failure of the component.

In some examples, a non-transitory machine-readable medium for repairing a device can include a plurality of instructions that, in response to execution by a processor, cause the processor to obtain a feature set for a component and generate random trees based on the feature set and a training data set, wherein each of the random trees can include at least one predictive value representing a probability of a feature of the random trees indicating a failure of the component within a period of time. The plurality of instructions can also cause the processor to select a subset of the random trees based on the at least one predictive value, determine a likelihood of the failure of the component based on operational data for one or more devices and the subset of the random trees, and transmit an explanation to a remote device for the likelihood of failure of the component by indicating the feature selected from the subset of the random trees.

Alternatively, or in addition, the plurality of instructions can cause the processor to determine that the at least one predictive value for the one or more features of the one or more random trees does not indicate the failure of the component, wherein there are at least two features in the one or more random trees and filter the at least one feature that does not indicate the failure of the component. Alternatively, or in addition, the feature set represents one or more mathematical operations performed on a source data set. Alternatively, or in addition, the source data set represents operational data from a medical device comprising an x-ray device or a magnetic resonance imaging device. Alternatively, or in addition, the operational data represents a battery characteristic, a coil characteristic, an input/output device characteristic, or a combination thereof. Alternatively, or in addition, the plurality of instructions can cause the processor to optimize the selecting the subset of the one or more random trees by removing at least one branch from the one or more random trees to decrease overlap between features of the one or more random trees.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present invention. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

What is claimed is:

1. A system for detecting malfunctioning components comprising:
   a processor to:
      obtain a feature set for a component;
      generate one or more random trees based on the feature set and a training data set, wherein each of the one or more random trees comprises at least one predictive value representing a probability of a feature of the one or more random trees indicating a failure of the component within a period of time;
      select a subset of the one or more random trees based on the at least one predictive value;
      determine a likelihood of the failure of the component based on operational data for one or more devices and the subset of the one or more random trees; and
      transmit an explanation to a remote device for the likelihood of failure of the component by indicating the feature selected from the subset of the one or more random trees.

2. The system of claim 1, wherein the processor is to:
   determine that the at least one predictive value for the features of the one or more random trees does not indicate the failure of the component, wherein there are at least two features in the one or more random trees; and
   filter at least one feature that does not indicate the failure of the component.

3. The system of claim 1, wherein the feature set represents one or more mathematical operations performed on a source data set, the one or more mathematical operations comprising a standard deviation, a minimum value, a maximum value, or a combination thereof.

4. The system of claim 3, wherein the source data set represents operational data from a medical device comprising an x-ray device or a magnetic resonance imaging device.

5. The system of claim 4, wherein the operational data represents a battery characteristic, a coil characteristic, an input/output device characteristic, or a combination thereof.

6. The system of claim 1, wherein the processor is to optimize the selecting the subset of the one or more random trees by removing at least one branch from the one or more random trees to decrease overlap between a combination of features from the one or more random trees.

7. The system of claim 1, wherein the processor is to transmit an alert comprising the explanation to the remote device, and wherein the alert comprises a message indicating the component of a device along with the probability of failure of the component within the period of time and threshold for one or more features of the feature set used to determine the probability of failure of the component.

8. A method for maintaining a device comprising:
obtaining a feature set for a component;
generating one or more random trees based on the feature set and a training data set, wherein each of the one or more random trees comprises at least one predictive value representing a probability of a feature of the one or more random trees indicating a failure of the component within a period of time;
selecting a subset of the one or more random trees based on the at least one predictive value;
determining a likelihood of the failure of the component based on operational data for one or more devices and the subset of the one or more random trees; and
transmitting an explanation to a remote device for the likelihood of failure of the component by indicating the feature selected from the subset of the one or more random trees.

9. The method of claim 8, comprising:
determining that the at least one predictive value for the features of the one or more random trees does not indicate the failure of the component, wherein there are at least two features in the one or more random trees; and
filtering at least one feature that does not indicate the failure of the component.

10. The method of claim 8, wherein the feature set represents one or more mathematical operations performed on a source data set.

11. The method of claim 10, wherein the source data set represents operational data from a medical device comprising an x-ray device or a magnetic resonance imaging device.

12. The method of claim 11, wherein the operational data represents a battery characteristic, a coil characteristic, an input/output device characteristic, or a combination thereof.

13. The method of claim 8 further comprising optimizing the selecting the subset of the one or more random trees by removing at least one branch from the one or more random trees to decrease overlap between features of the one or more random trees.

14. The method of claim 8 further comprising transmitting an alert comprising the explanation to the remote device, and wherein the alert comprises a message indicating the component of the device along with the probability of failure of the component within the period of time and a threshold for one or more features of the feature set used to determine the probability of failure of the component.

15. A non-transitory machine-readable medium for repairing a device comprising a plurality of instructions that, in response to execution by a processor, cause the processor to:
obtain a feature set for a component;
generate one or more random trees based on the feature set and a training data set, wherein each of the one or more random trees comprises at least one predictive value representing a probability of a feature of the one or more random trees indicating a failure of the component within a period of time;
select a subset of the one or more random trees based on the at least one predictive value;
determine a likelihood of the failure of the component based on operational data for one or more devices and the subset of the one or more random trees; and
transmit an explanation to a remote device for the likelihood of failure of the component by indicating the feature and at least one threshold value selected from the subset of the one or more random trees.

16. The non-transitory machine-readable medium of claim 15, wherein the plurality of instructions cause the processor to:
determine that the at least one predictive value for the features of the one or more random trees does not indicate the failure of the component, wherein there are at least two features in the one or more random trees; and
filter at least one feature that does not indicate the failure of the component.

17. The non-transitory machine-readable medium of claim 15, wherein the feature set represents one or more mathematical operations performed on a source data set.

18. The non-transitory machine-readable medium of claim 17, wherein the source data set represents operational data from a medical device comprising an x-ray device or a magnetic resonance imaging device.

19. The non-transitory machine-readable medium of claim 18, wherein the operational data represents a battery characteristic, a coil characteristic, an input/output device characteristic, or a combination thereof.

20. The non-transitory machine-readable medium of claim 15, wherein the plurality of instructions cause the processor to optimize the selecting the subset of the one or more random trees by removing at least one branch from the one or more random trees to decrease overlap between features of the one or more random trees.

* * * * *